US010928924B2

(12) United States Patent
Kapinos et al.

(10) Patent No.: US 10,928,924 B2
(45) Date of Patent: Feb. 23, 2021

(54) TYPING FEEDBACK DERIVED FROM SENSOR INFORMATION

(71) Applicant: Lenovo (Singapore) Pte. Ltd., Singapore (SG)

(72) Inventors: Robert James Kapinos, Durham, NC (US); Axel Ramirez Flores, Cary, NC (US); Suzanne Marion Beaumont, Wake Forest, NC (US); James Anthony Hunt, Chapel Hill, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1108 days.

(21) Appl. No.: 14/089,921

(22) Filed: Nov. 26, 2013

(65) Prior Publication Data

US 2015/0147730 A1    May 28, 2015

(51) Int. Cl.
*G06F 3/02* (2006.01)
*G09B 13/00* (2006.01)

(52) U.S. Cl.
CPC ........... *G06F 3/0219* (2013.01); *G09B 13/00* (2013.01)

(58) Field of Classification Search
CPC ..................................................... G06F 3/017
See application file for complete search history.

(56) References Cited

U.S. PATENT DOCUMENTS

| 5,570,113 | A | * | 10/1996 | Zetts | G06F 3/04883 345/156 |
| 8,147,248 | B2 | * | 4/2012 | Rimas-Ribikauskas | G09B 7/00 434/118 |
| 8,756,499 | B1 | * | 6/2014 | Kataoka | G06F 17/276 715/259 |
| 2006/0071915 | A1 | * | 4/2006 | Rehm | G06F 1/1616 345/173 |
| 2006/0209014 | A1 | * | 9/2006 | Duncan | G06F 3/04883 345/156 |
| 2006/0242607 | A1 | * | 10/2006 | Hudson | G06F 3/04817 715/863 |
| 2011/0102570 | A1 | * | 5/2011 | Wilf | G06F 3/017 348/77 |
| 2012/0113008 | A1 | * | 5/2012 | Makinen | G06F 3/016 345/168 |
| 2014/0108992 | A1 | * | 4/2014 | Bi | G06F 17/276 715/773 |

(Continued)

FOREIGN PATENT DOCUMENTS

WO    WO 2007097548 A1 *  8/2007  ............. G06F 3/017

*Primary Examiner* — Xuan M Thai
*Assistant Examiner* — Sadaruz Zaman
(74) *Attorney, Agent, or Firm* — Ference & Associates LLC

(57) ABSTRACT

An embodiment provides a method, including: operating a sensor of an information handling device to capture location information of a user; determining, using a processor to analyze the location information, a position of a finger of a user relative to a keyboard location; determining, using the processor, a difference between an expected location for the finger and the position of the finger of the user relative to the keyboard location; and offering, using the processor, feedback regarding the difference determined. Other aspects are described and claimed.

20 Claims, 3 Drawing Sheets

(56) References Cited

U.S. PATENT DOCUMENTS

| | | | |
|---|---|---|---|
| 2014/0267029 A1* | 9/2014 | Govil | G06K 9/00355 345/157 |
| 2014/0354550 A1* | 12/2014 | Mendonca | G06F 3/02 345/168 |
| 2015/0169153 A1* | 6/2015 | Zugasti Hays | G06F 3/04812 715/801 |
| 2016/0026258 A1* | 1/2016 | Ou | G06F 17/276 715/773 |

* cited by examiner

TYPING FEEDBACK DERIVED FROM SENSOR INFORMATION

BACKGROUND

Information handling devices ("devices"), for example laptop computers, tablet computers, notebook or hybrid/convertible computers, desktop computers, etc., may be used in connection with a keyboard. Various different types of keyboard layouts exist, e.g., an American QWERTY keyboard for Latin script (e.g., the English language), non-QWERTY keyboards for Latin script (e.g., Dvorak keyboard), keyboards for different languages, e.g., character based languages, etc.

For each keyboard type or sets of common types, typists utilize a set of key stroke mechanics to effect input on the keyboard. For example, standard touch typing techniques exist for typing on an American QWERTY keyboard for English. As an example, there is a "home row" of keys, e.g., the keys "asdf" and "jkl;" on which the user rests his or her fingers. Likewise, a user typically strikes keys above and below the home row in a normalized or standard patter, e.g., the "t" key is struck with the index finger of the left hand. Such standard or normal patters of providing input are routinely taught in typing classes.

BRIEF SUMMARY

In summary, one aspect provides a method, comprising: operating a sensor of an information handling device to capture location information of a user; determining, using a processor to analyze the location information, a position of a finger of a user relative to a keyboard location; determining, using the processor, a difference between an expected location for the finger and the position of the finger of the user relative to the keyboard location; and offering, using the processor, feedback regarding the difference determined.

Another aspect provides an information handling device, comprising: a sensor; a processor; and a memory that stores instructions that are executed by the processor to: operate the sensor to capture location information of a user; determine, using the location information, a position of a finger of a user relative to a keyboard location; determine a difference between an expected location for the finger and the position of the finger of the user relative to the keyboard location; and offer feedback regarding the difference determined.

Another aspect provides a product, comprising: a device readable storage device having device readable code stored therewith, the device readable code comprising: code that operates a sensor of an information handling device to capture location information of a user; code that determines, using a processor to analyze the location information, a position of a finger of a user relative to a keyboard location; code that determines, using the processor, a difference between an expected location for the finger and the position of the finger of the user relative to the keyboard location; and code that offers, using the processor, feedback regarding the difference determined.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
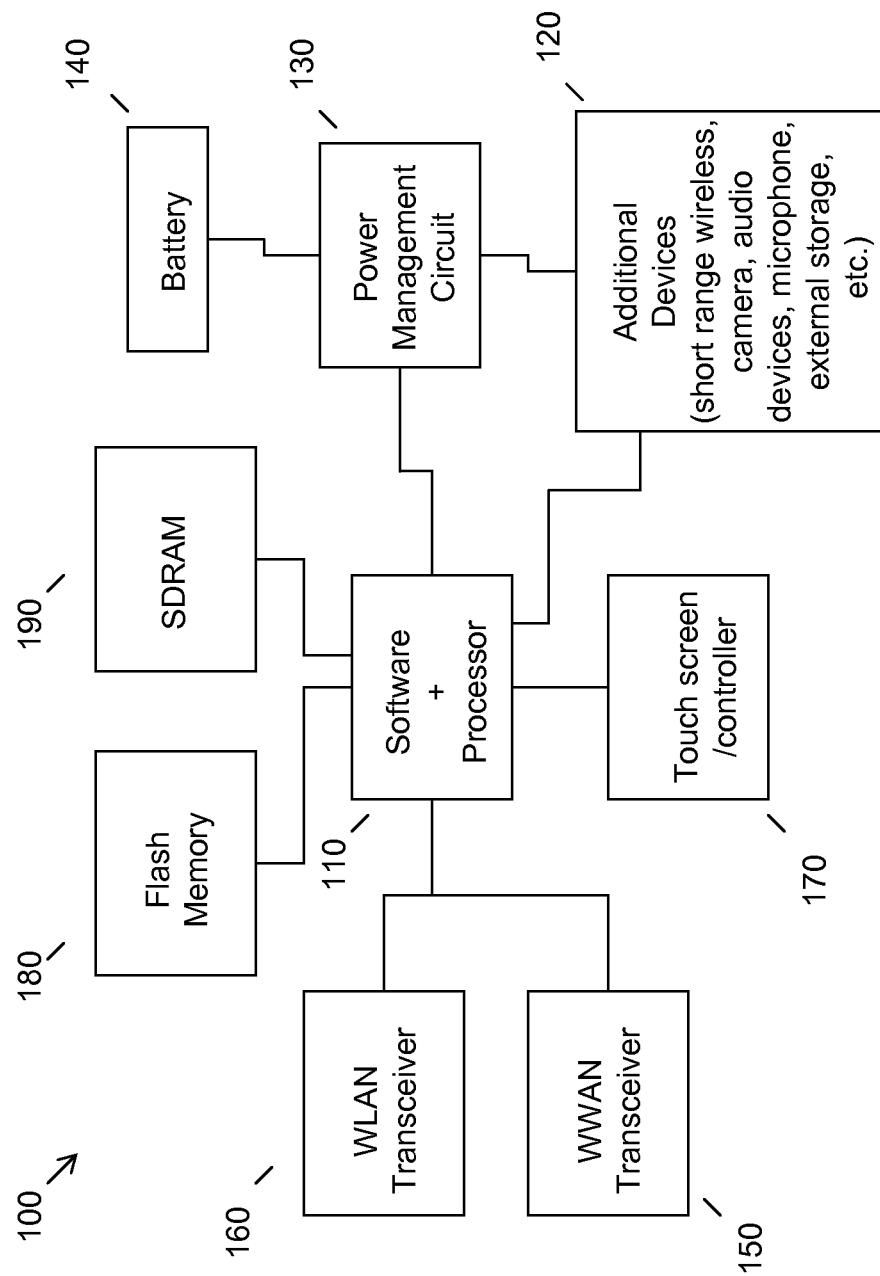
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

People use real-time correction of text entry. Programs like MICROSOFT WORD and EXCEL software applications currently implement this entirely on the system internal side. Many errors come not from wrong thought but from incorrect key mechanics or poor input practices. This problem is not addressed by existing applications, e.g., auto-correction capability of computers.

There are no common existing solutions in this field. Existing technology consists of blind direction (e.g., showing on screen in tutorial what to do), mistake correction (e.g., changing the input data according to heuristics), mistake identification (e.g., showing errors onscreen and asking the user to fix them), and human intervention (e.g., someone teaching you how to do it better). Unfortunately, none of these approaches handles long term identification, correction, and improvement of input mechanics.

Accordingly, an embodiment utilizes a sensor, e.g., an optical sensor such as a camera or IR sensors, hover sensors, etc., to measure the user's hand positions and key actuation mechanics during error detection. The error detection routines can correlate mechanically induced errors in finger movements with detected errors. Once error in mechanics are detected, an embodiment provides real-time recommendations to correct key input behavior. After some long-term data analysis, reminders can also be provided for bad habits that can produce ergonomic or efficiency problems. Haptic, audio, or visual, feedback may be given to train the user into good habits without interrupting the flow of work.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example a camera for determining location information of the user, including keystroke mechanics information, as further described herein. Commonly, system 100 will include a touch screen 170 for data input and display/rendering. System 100 also typically includes various memory devices, for example flash memory 180 and SDRAM 190.

Figure 2:
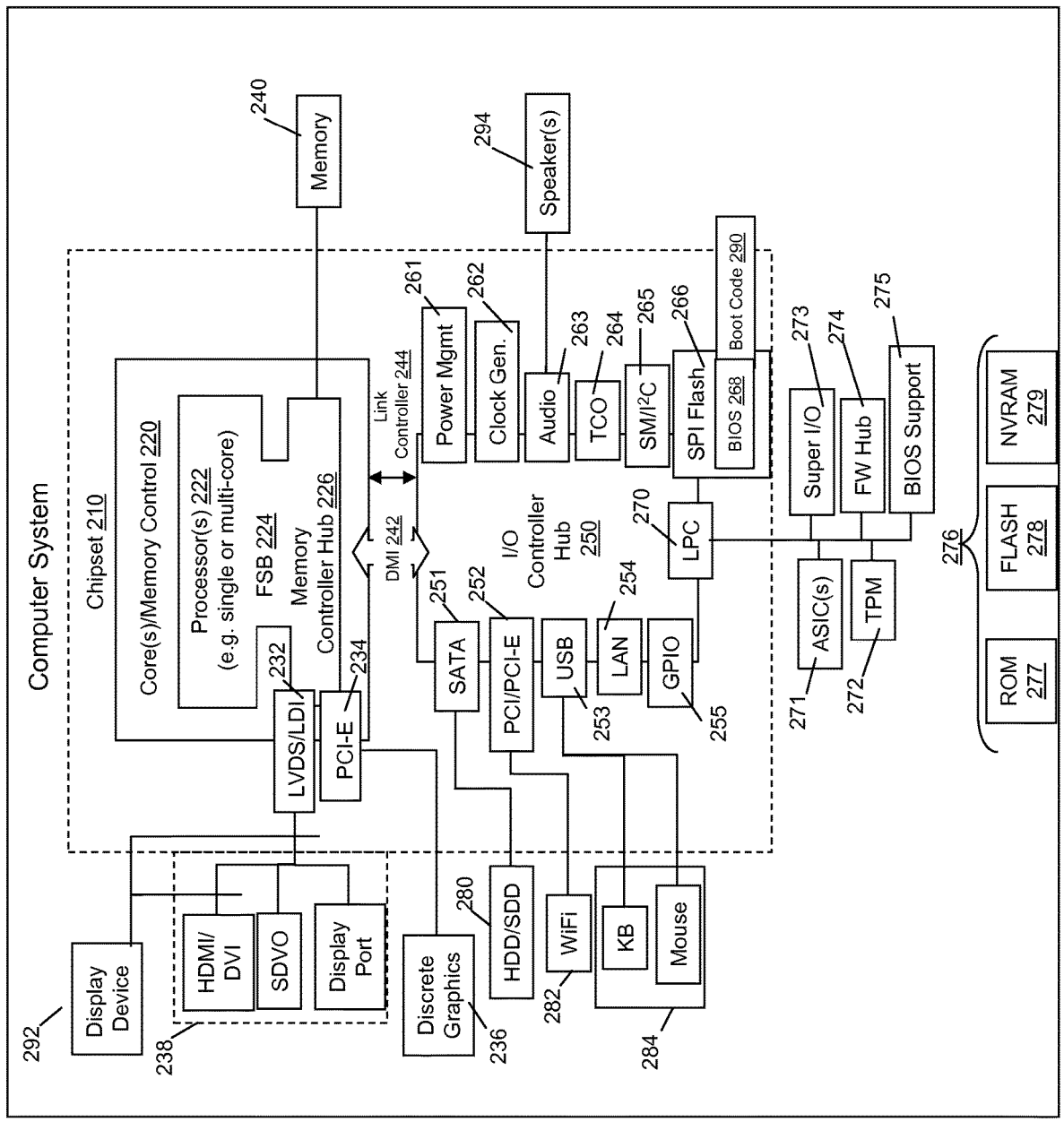
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in connection with a tablet (e.g., having a physical keyboard operatively coupled thereto), notebook or laptop computer, etc. For example, a device having circuitry such as outlined in FIG. 1 may be used in a tablet computer and may operate a camera 120 and display 170 to capture user location information and offer feedback, respectively, as further described herein. Similarly, a device including circuitry as outlined in FIG. 2 may be used in a larger device, such as a laptop or desktop computer, for use in capturing location information regarding the user and offering feedback, as further described herein.

Figure 3:
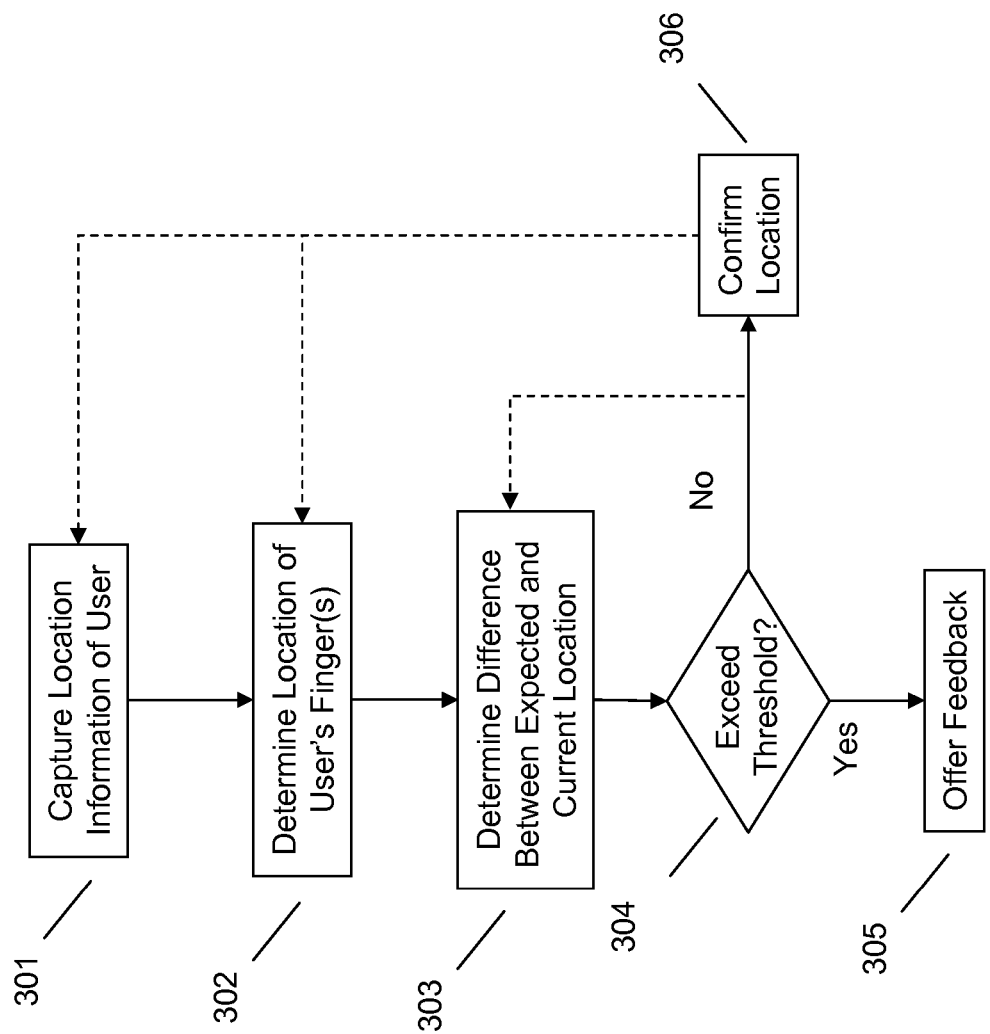
FIG. 3 illustrates an example method of providing typing feedback derived from sensor information.

Turning to FIG. 3, an embodiment provides a method in which a user may have location information, e.g., image information captured by a camera or other optical sensor, at 301. This image information may be particularly focused on a particular part of the user, e.g., a camera having its view point directed towards the user's hands located proximate to a keyboard device. Alternatively, a larger image may be captured of the user and a sub portion of the image may be sampled to produce the image information, e.g., with respect to the portion of the image capturing the user's hand location relative to the keyboard. As will may be appreciated, other sensor(s) may be utilized, e.g., hover sensors disposed in the input interface, so long as accurate location information may be captured.

Continuing with the non-limiting example of using image information, once an embodiment has the image information of the user, an embodiment may determine a location of the user, e.g., the user's finger location(s) with respect to a keyboard location, e.g., a particular key, a home row of keys, etc., at 302.

This determination may be different for different keyboard designs. For example, for an American keyboard of a QWERTY layout or design, an embodiment may determine or map the user's finger location(s) to a known design pattern (e.g., key locations) of the keyboard design. Thus, it will be appreciated that in certain circumstances the method may include determining a keyboard design, e.g., via pre-loading keyboard layouts in an operating system and thereafter receiving an indication, e.g., from the keyboard or as a pre-installed feature, of which keyboard design is being utilized.

Therefore, an embodiment will be able to determine a user's current finger location with respect to one or more known key locations at 303. Given this information, an embodiment may determine a difference between an expected location and the current location of the user's finger(s) at 303. This may take a variety of forms.

For example, in an initial analysis, an embodiment may simply determine if there is a difference between the finger locations of a user and an expected starting location, e.g., resting on or near a home row of keys with the proper alignment. Therefore, the determining step at 303 may take place prior to any user input being received.

As another example, the determining step may be a more complex analysis based on known typing rules or standards and accepted finger locations and/or key stroke mechanics associated with various inputs. For example, known typing rules may be based on accepted best practices with respect to the keyboard design or layout. Thus, the determining step performed at 303 may take place in connection with receiving user input and/or in connection with the user attempting to provide input.

In such a context, a user may initially start in a proper location, e.g., on or near the home row of keys. This may be initially determined at 304 by comparing the expected starting location with the current location of the user's fingers, i.e., using analysis of the image information. Thus, the location may be confirmed at 306 (as positive feedback, or optionally no feedback may be provided in such a case). If the user begins to move the location of one or more fingers, an embodiment may re-determine the current location, i.e., re-perform the determining step at 302. This may be followed by re-determining an expected location at 303, which may be calculated in a variety of ways.

For example, for a particular keyboard design, a particular movement or trajectory of a finger of the user may never be appropriate. Thus, for example, if a user begins properly in the home row of keys but then extends his or her left index finger to strike the "y" key, an embodiment may determine, e.g., at 304, that this is contrary to an accepted typing style that dictates that another finger, i.e., the right index finger should be used for this input. Therefore, an embodiment may determine at 304 that the current location of the user's left index finger exceeds any acceptable difference in position in this regard and offer feedback, e.g., corrective feedback in the form of an audible and/or visual feedback, at 305 such that the user is apprised of the errant movement. This may include for example corrective feedback in the form of the correct input, e.g., a visual or audible indication of the appropriate finger and location thereof.

In another example, an embodiment may utilize additional information, e.g., a partially input word to an underlying application, to proactively predict the next key input and provide feedback regarding the same. For example, a user may be attempting to input the word "dog" and have already input the letters "d" and "o". Accordingly, an embodiment may narrow down, given an understanding of the language being utilized, which words are possible to form given the already received input. This additional information may be used in the determining step at 303, i.e., to proactively predict or suggest key locations for the next key input. Moreover, this additional information may be utilized in determining at 303 a difference between the current location of a user's finger(s) and the next possible acceptable inputs. Thus, if a user moves his or her left index finger up towards the "4" key, an embodiment may determine that this exceeds a distance threshold at 304 with respect to any possible acceptable key entry (e.g., "t" or "r").

Additional levels of analysis may also be included. For example, an embodiment may analyze the sentence or other language component in order to determine that the word intended is "dog" rather than "dot", e.g., as included in the sentence "I went to walk the dog". Thus, an embodiment may make refined feedback decisions at 303 and 304 on this basis. For example, a user moving his or her index finger up from the home row key "f" towards "t" in this case, while possibly acceptable to form the word "dot", would be noticed in this context as exceeding a threshold distance from the expected input of "g", located to the right of the left index finger in the home row position, i.e., the "f" key. A similar type of analysis and feedback may be used in an instruction setting, e.g., where a known body of text is being input.

An embodiment may take into account the keyboard locations, e.g., as belonging to a language specific layout, and adapt the feedback to the type of language layout (e.g., typing style). Thus, an embodiment may determine that the attached keyboard is a language specific layout and adapts tutoring/corrective feedback to the keyboard layout and/or the language.

In another example, an embodiment may determine the keyboard layout or mapping, e.g., the keyboard layout is of non-QWERTY style, and specific non-QWERTY key input methods may be used for feedback, correction, etc. Additionally, an embodiment may include predetermined or unique key combinations which are handled by a special subroutine for separate handling, e.g., specially handled such as being excluded from feedback mechanisms. For example, the processor may handle such predetermined inputs by specific logic, e.g., to deliberately ignores predetermined differences between "correct" key input(s) and the actual key inputs.

Accordingly, an embodiment may leverage data known about a particular keyboard layout and a user's current location (e.g., finger locations) with respect thereto, as derived from image analysis or other sensor data, to assist in typing instruction. The typing assist functionality may be modified as appropriate. For example, an embodiment may determine the language being utilized, the keyboard layout being utilized, the context of key input (e.g., word and/or sentence analysis), etc., and modify settings appropriately. For example, for particular keyboards, the mapping of keys (and expected locations) will differ and the threshold(s) employed for determining distances between current locations and expected locations may differ as well. Using an embodiment, a user may improve his or her typing skills by virtue of having feedback given regarding appropriate placement of the hands and fingers with respect to the keyboard, the fingers to be used to strike particular keys, the angle and trajectory to be used to strike the keys, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
operating a sensor of an information handling device to capture location information of a user;
receiving typing input from the user on a keyboard;
determining, using the location information and responsive to receiving the typing input, a current position of a finger of a user relative to a particular location on the keyboard in view of the typing input, wherein the determining comprises receiving an indication of a layout of the keyboard and mapping the position of a finger of a user to the layout of the keyboard;
determining, using the processor, a difference between an expected location and movement for the finger to provide the typing input and the current position of the finger, wherein the expected location and movement is identified using typing rules associated with the layout of the keyboard and at least one of: accepted finger locations and key stroke mechanics associated with providing the typing input for the layout of the keyboard, wherein the determining comprises identifying key actuation mechanics responsive to determining a difference; and
offering, using the processor, feedback regarding the difference determined.

2. The method of claim 1, wherein the sensor is an optical sensor.

3. The method of claim 1, wherein:
the determining a difference between an expected location for the finger and the current position of the finger of the user relative to the keyboard location comprises determining that the difference exceeds a predetermined threshold; and
the offering feedback regarding the determined difference includes offering corrective feedback.

4. The method of claim 3, wherein the corrective feedback includes one or more of audible feedback and visual feedback.

5. The method of claim 3, wherein the corrective feedback includes a visual indication of an appropriate finger location with respect to the keyboard.

6. The method of claim 1, wherein the expected location is proactively determined.

7. The method of claim 6, wherein the offering comprises proactively offering a correct location for a next key input, and further wherein the next key input is derived at least in part using previously received user input.

8. The method of claim 1, wherein the determining a difference between an expected location for the finger and the current position of the finger of the user relative to the keyboard location further comprises determining a predetermined difference and excluding the predetermined difference from triggering the offering of feedback.

9. The method of claim 1, wherein the offering feedback regarding the difference determined is adapted to a language layout of the keyboard.

10. The method of claim 1, wherein the determining a difference between an expected location for the finger and the current position of the finger of the user relative to the keyboard location comprises accessing a data store of expected locations for a particular keyboard design.

11. An information handling device, comprising:
a sensor;
a processor; and
a memory that stores instructions that are executed by the processor to:
operate the sensor to capture location information of a user;
receive typing input from the user on a keyboard;
determine, using the location information and responsive to receiving the typing input, a current position of a finger of a user relative to a particular location on the keyboard in view of the typing input, wherein the determining comprises receiving an indication of a layout of the keyboard and mapping the position of a finger of a user to the layout of the keyboard;
determine a difference between an expected location and movement for the finger to provide the typing input and the current position of the finger, wherein the expected location and movement is identified using typing rules associated with the layout of the keyboard and at least one of: accepted finger locations and key stroke mechanics associated with providing the typing input for the layout of the keyboard, wherein the determining comprises identifying key actuation mechanics responsive to determining a difference; and
offer feedback regarding the difference determined.

12. The information handling device of claim 11, wherein the sensor is an optical sensor.

13. The information handling device of claim 11, wherein:
to determine a difference between an expected location for the finger and the current position of the finger of the user relative to the keyboard location comprises determining that the difference exceeds a predetermined threshold; and
to offer feedback regarding the determined difference includes offering corrective feedback.

14. The information handling device of claim 13, wherein the corrective feedback includes one or more of audible feedback and visual feedback.

15. The information handling device of claim 13, wherein the corrective feedback includes a visual indication of an appropriate finger location with respect to the keyboard.

16. The information handling device of claim 11, wherein to offer comprises proactively offering a correct location for a next key input, and further wherein the next key input is derived at least in part using previously received user input.

17. The information handling device of claim 11, wherein to determine a difference between an expected location for the finger and the current position of the finger of the user relative to the keyboard location further comprises determining a predetermined difference and excluding the predetermined difference from triggering the offering of feedback.

18. The information handling device of claim 11, wherein to offer feedback regarding the difference determined is adapted to a language layout of the keyboard.

19. A product, comprising:
a non-transitory storage medium having device readable code stored therewith, the device readable code being executable by a processor and comprising:
code that operates a sensor of an information handling device to capture location information of a user;
code that receives typing input from the user on a keyboard;
code that determines, the location information and responsive to receiving the typing input, a current position of a finger of a user relative to a particular location on the keyboard in view of the typing input, wherein the determining comprises receiving an indication of a layout of the keyboard and mapping the position of a finger of a user to the layout of the keyboard;
code that determines, using the processor, a difference between an expected location and movement for the finger to provide the typing input and the current position of the finger, wherein the expected location and movement is identified using typing rules associated with the layout of the keyboard and at least one of: accepted finger locations and key stroke mechanics associated with providing the typing input for the layout of the keyboard, wherein the determining comprises identifying key actuation mechanics responsive to determining a difference; and
code that offers, using the processor, feedback regarding the difference determined.

20. The method of claim 1, wherein the expected location is further based upon a predicted key input.

* * * * *